United States Patent [19]

Wohlsen

[11] Patent Number: 4,464,333

[45] Date of Patent: Aug. 7, 1984

[54] MOLTEN CORE RETENTION AND SOLIDIFICATION APPARATUS

[75] Inventor: William D. Wohlsen, East Granby, Conn.

[73] Assignee: Combustion Engineering, Inc., Windsor, Conn.

[21] Appl. No.: 354,979

[22] Filed: Mar. 5, 1982

[51] Int. Cl.³ .............................................. G21C 9/00
[52] U.S. Cl. .................................................... 376/280
[58] Field of Search ........................................ 376/280

[56] References Cited

U.S. PATENT DOCUMENTS

| | | |
|---|---|---|
| 3,506,540 | 4/1970 | Yevick et al. ............ 376/280 |
| 3,607,630 | 9/1971 | West et al. |
| 4,003,785 | 1/1977 | Rau et al. ............ 376/280 |
| 4,073,682 | 2/1978 | Barleon et al. |
| 4,113,560 | 9/1978 | Driscoll et al. |
| 4,121,970 | 10/1978 | Albrecht et al. |
| 4,154,650 | 5/1979 | Prescott et al. ............ 376/280 |
| 4,240,875 | 12/1980 | Katscher ............ 376/280 |
| 4,252,612 | 2/1981 | Cooper et al. ............ 376/280 |
| 4,289,582 | 9/1981 | Parr et al. ............ 376/280 |

FOREIGN PATENT DOCUMENTS

| | | | |
|---|---|---|---|
| 1099828 | 4/1981 | Canada ............ | 376/280 |
| 2535729 | 2/1977 | Fed. Rep. of Germany ...... | 376/280 |
| 1545439 | 5/1979 | United Kingdom ............ | 376/280 |

Primary Examiner—Harvey E. Behrend
Attorney, Agent, or Firm—David L. Smith

[57] ABSTRACT

A fluid cooled heat exchanger molten core retention and solidification apparatus (10) is a vertically oriented array of tube assemblies located beneath a reactor vessel. Water under forced circulation flows through inlet tube (18) into an inlet plenum (20) beneath the heat exchanger (10) up through the inner vertical tube (22), down through the annular space between the outside of the inner tube (22) and the inside of the outer tube (24) into an outlet plenum (28), then through tube (30) to a heat exchanger outside containment building (16) where heat is released. The array of vertical tube assemblies provides heat transfer surface within a few centimeters of all molten material and sufficient volume between the exterior surface of outer vertical tubes (24) to accommodate all expected molten material in the event of a meltdown of the core of the nuclear reactor.

4 Claims, 4 Drawing Figures

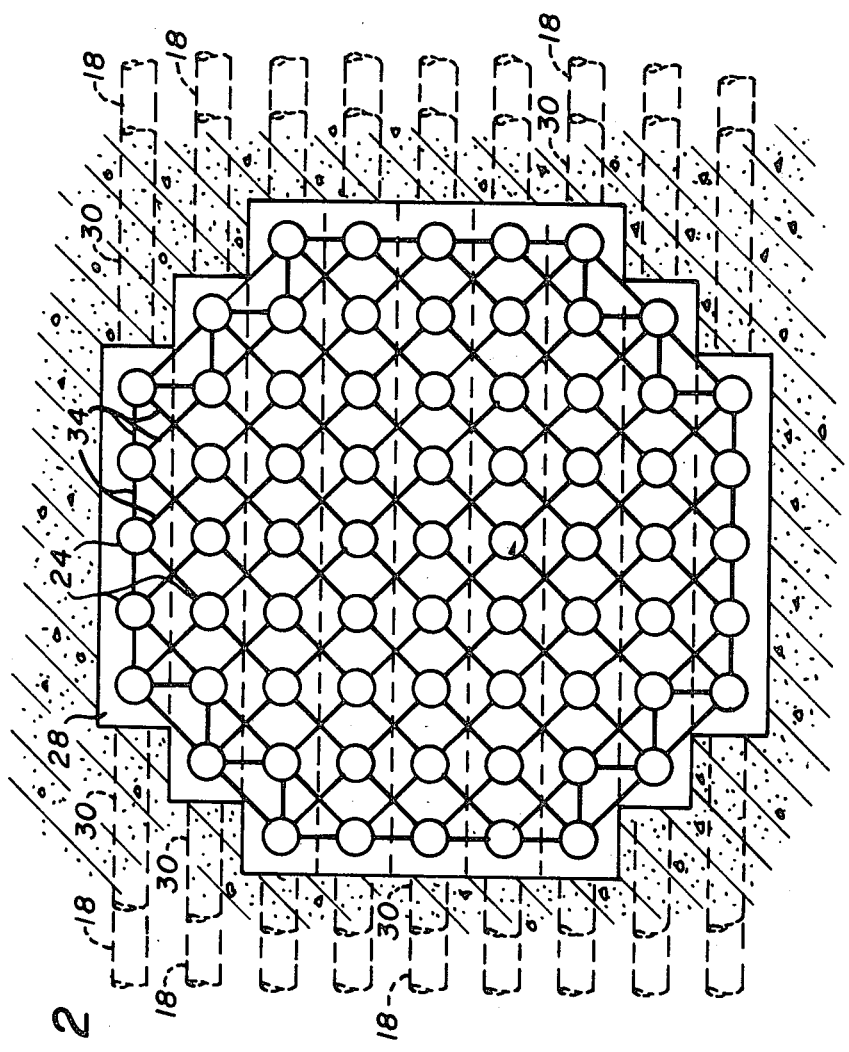
F I G. 2

MOLTEN CORE RETENTION AND SOLIDIFICATION APPARATUS

BACKGROUND OF THE INVENTION

This invention relates to a nuclear power plant containment system and in particular to a molten core retention and solidification apparatus that removes heat from a molten core within the containment building while preventing the molten core from penetrating the base of the containment building.

When the core of a nuclear reactor produces more heat than is removed from the core for a sufficiently long time period, the temperature of the core will rise and eventually exceed the melting temperature of its constituent materials. The core will melt through the reactor vessel and fall onto the structure beneath the reactor vessel. Core retention devices are designed to prevent the molten core and molten reactor vessel from penetrating the base of the containment building of a nuclear power plant. The various prior art core retention concepts fall generally within four categories. These categories are water heat sink, sacrificial bed, crucible, and mass dispersal.

The water heat sink core retention concept provides a large reservoir of water beneath the reactor vessel into which the molten core or molten reactor vessel falls. Heat is removed from the molten core as the temperature of the water increases and as water changes state to form steam. This core retention concept requires a large cavity beneath the reactor vessel to retain the reservoir of water. Furthermore as the water changes state to steam, makeup water must be provided and the steam produced pressurizes the containment building.

The sacrificial bed core retention concept contains a bed of material beneath the reactor vessel that is sacrificed as the molten core is deposited on the bed. The bed may be miscible, where the bed dilutes the molten core or immiscible, where the molten core floats on top of the bed. The sacrificial bed may also be of a solid material, such as lead, that vaporizes when the molten core is deposited on the sacrificial bed.

The crucible core retention concept places a large crucible beneath the reactor vessel. The crucible can take the thermal and mechanical loads of a melting core or reactor vessel and simply catches and holds the molten material.

The mass dispersal core retention concept disperses the molten core or reactor vessel throughout a large heat sink contained beneath the reactor vessel.

Prior art core retention concepts attempt to contain within the containment building both the molten core or reactor vessel and the energy contained within the molten core or reactor vessel. Retaining the molten core or reactor vessel within the containment building is essential. However, it is not necessary to contain the heat energy content of the molten core or reactor vessel within the containment building.

Therefore, a need exists for a heat exchanger molten core retention and solification apparatus to contain the mass of the molten core or reactor vessel while simultaneously removing the heat content of the molten mass from within the containment building.

SUMMARY OF THE INVENTION

The present invention fulfills the need of a heat exchanger to contain the molten core or reactor vessel while simultaneously removing the heat contained therein to a location external to the containment building. Heat is transferred from the molten core or reactor vessel to the cooling water in the water cooled heat exchanger. The heated water then passes to a heat exchanger outside the containment building, such as a cooling tower, where the heat is released outside the containment building.

The heat exchanger molten core retention and solidification apparatus is an array of vertically oriented water cooled tube assemblies located beneath the reactor vessel. This design permits the molten core or reactor vessel to surround the heat exchanger tube assemblies in the event of a meltdown of the core and provides a large surface area for heat transfer. By proper spacing of the array of vertical tube assemblies, no portion of molten core is more than a few centimeters from a water cooled tube of the heat exchanger. The volume between the exterior surface of the tube assemblies is sufficient to accommodate a volume of molten material including the entire molten core and reactor internals as well as a portion of the reactor vessel. The heat exchanger not only retains the molten material but also cools and solidifies the material. Even after the molten material has solidified, decay heat is transferred from the solidified mass to a heat exchanger outside the containment building.

Each tube assembly is comprised of an inner and outer vertically extending tube. The vertically extending outer heat exchanger tube is closed at its upper end and open at its lower end. The vertically extending inner tube is open at both its upper end and lower end. The inner tube is disposed substantially concentrically within and spaced from the outer tube so as to define a flow passageway through the interior of the inner tube and the annular space between the outside of the inner tube and the inside of the outer tube. Each tube assembly is in fluid communication with an inlet and an outlet plenum. The lower end of the outer tube is in fluid communication with one of the plenums and the lower end of the inner tube with the other of the plenums.

Water under forced circulation is passed into the inlet plenum, then through the flow passageways defined within the tube assemblies into and through the outlet plenum then to a heat exchanger outside the containment building. The equipment necessary to provide forced circulation of the cooling water is outside the containment building.

To insure that the molten core and reactor vessel does not become critical during or after the solidification process, the inside surface of the outer heat exchanger tubing is coated with a neutron absorbing material. The neutron absorbing material absorbs neutrons that would otherwise contribute to recriticality of the molten material.

To assure that the heat exchanger molten core retention and solidification apparatus does not melt, the exterior heat transfer surface of the outer heat exchanger tubes and the upper surface of the outlet plenums are covered with a layer of insulating material. Preferably, the layer of insulating material is a ceramic material or a layer of a carbon composite material such as graphite fibers in a graphite matrix. This protective layer absorbs the thermal shock when the molten core contacts the heat exchanger. The layer of insulating material has the property that it can withstand the temperature of the molten core without melting and can conduct heat rapidly enough through the protective layer to the heat exchanger to effectuate cooling of the molten core.

BRIEF DESCRIPTION OF THE DRAWING

FIG. 2 is a top view of the heat exchanger molten core retention and solidification apparatus taken along the line 2—2 of FIG. 1;

DESCRIPTION OF THE PREFERRED EMBODIMENT

Figure 1:
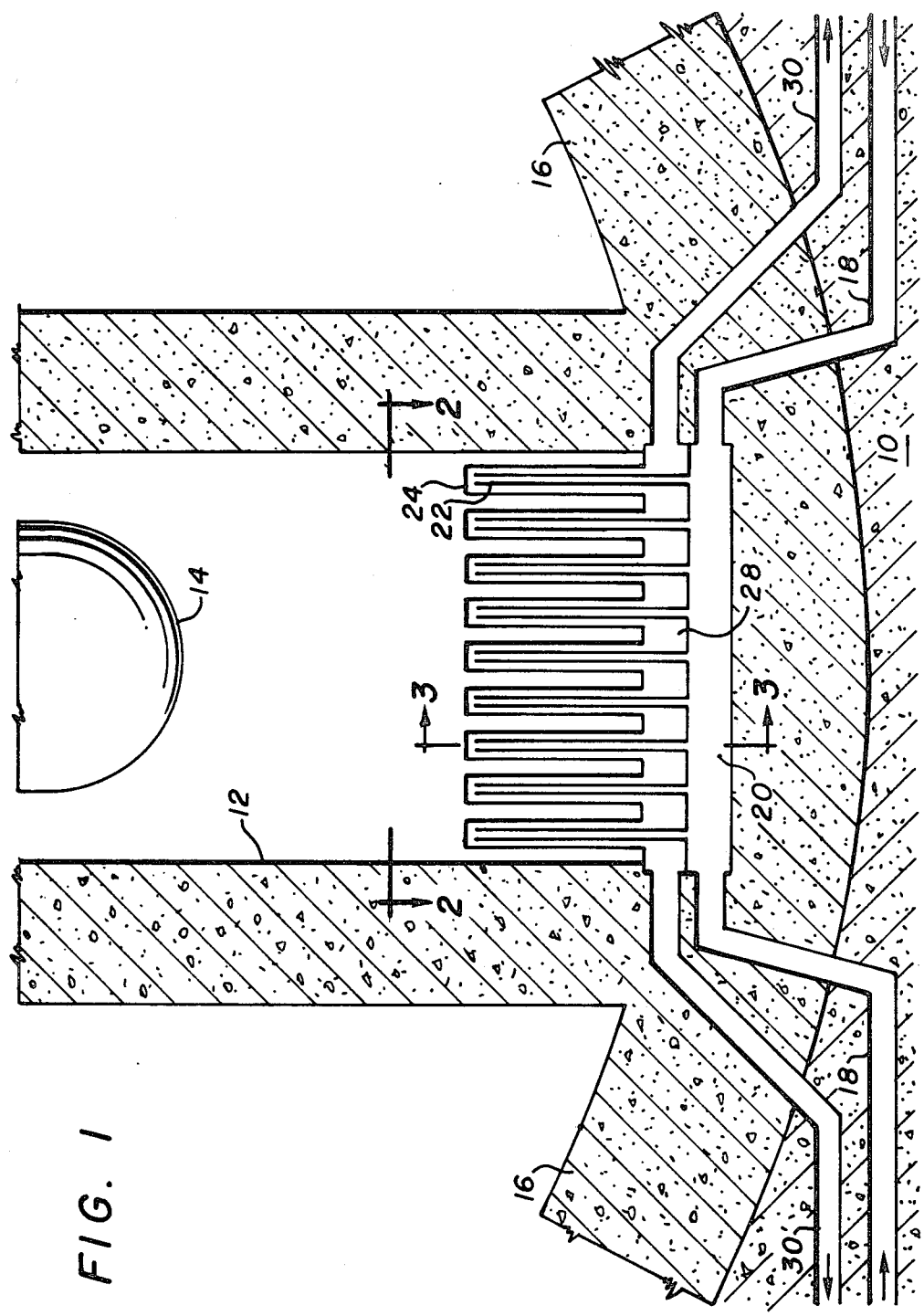
FIG. 1 is a partially cut away side view of the heat exchanger molten core retention and solidification apparatus of the present invention in relative position to a reactor vessel and containment building.
Figure 4:
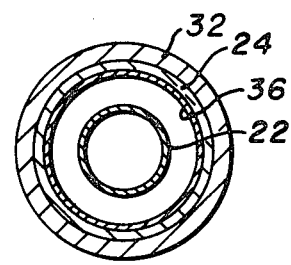
FIG. 4 is a cross-section of a vertical tube of the heat exchanger molten core retention and solidification apparatus taken along the line 4—4 of FIG. 3.

Referring to the drawing, there is depicted therein a heat exchanger molten core retention and solidification apparatus 10 designed in accordance with the present invention disposed in a concrete cavity 12 beneath a nuclear reactor vessel 14. Heat exchanger molten core retention and solidification apparatus 10 is within containment building 16 as best seen in FIG. 1. Heat exchanger molten core retention and solidification apparatus 10 is an apparatus for retaining a molten core or molten reactor vessel 14 within containment building 16 while removing the heat contained therein from containment building 16. The heat may be contained in the molten material or generated by the molten material.

Heat exchanger molten core retention and solidification apparatus 10 is an array of vertically oriented water cooled tube assemblies located beneath reactor vessel 14. Each tube assembly is comprised of two vertically extending tubes. Vertically extending outer tube 24 is closed at its upper end 26 and open at its lower end. Vertically extending inner tube 22, open at both its upper and lower ends, is disposed substantially concentrically within and spaced from outer tube 24 so as to define a flow passageway through the interior of inner tube 22 and the annular space between the outside of inner tube 22 and the inside of the outer tube 24. The lower end of outer tube 24 is in fluid communication with outlet plenum 28. The lower end of inner tube 22 is in fluid communication with inlet plenum 20. The tube assemblies are preferably interconnected at upper end 26 of outer tube 24 by cross members 34 to strengthen the array of vertical tube assemblies.

Water under forced circulation passes through inlet tube 18 into inlet plenum 20 then through the flow passageways defined within the tube assemblies into and through outlet plenum 28 then through outlet tube 30 to a heat exchanger such as a cooling tower (not shown) outside of containment building 16. All necessary equipment to provide forced circulation of the cooling water, such as pumps and valves (not shown), are outside containment building 16.

As best seen in FIG. 2, inlet plenum 20 may be divided so that each row of vertical tubes 22 of heat exchanger 10 is supplied by a separate inlet plenum 20. The outlet plenum 28 similarly may be divided so that each row of vertical tubes 24 supply a separate outlet plenum 28. Each inlet tube 18 and outlet tube 30 can preferably be isolated outside containment building 16.

The temperature of the molten core or reactor vessel will be on the order of 2,745° C. (5,000° F.). To protect the upper surface of outlet plenum 28, the exterior surface of outer vertical tubes 24 and the walls of concrete cavity 12 in the region of heat exchanger 10, these surfaces are coated with a layer of protective insulating material 32. The insulating material 32 is preferably ceramic or a carbon composite material such as graphite fiber in a graphite matrix. This layer of protective material 32 has the property that it can withstand the high temperature of the molten core or reactor vessel without melting and simultaneously conduct heat from the molten material to the underlying outer tube 24 or outlet plenum 28.

The inside surface of the outer tube 24 is covered with a neutron absorbing material 36. Neutron absorbing material 36 absorbs neutrons emitted from the molten material that would otherwise contribute to recriticality of the molten material. Alternatively, tube 24 could be made of a neutron absorbing material to serve the neutron absorbing function.

Figure 3:
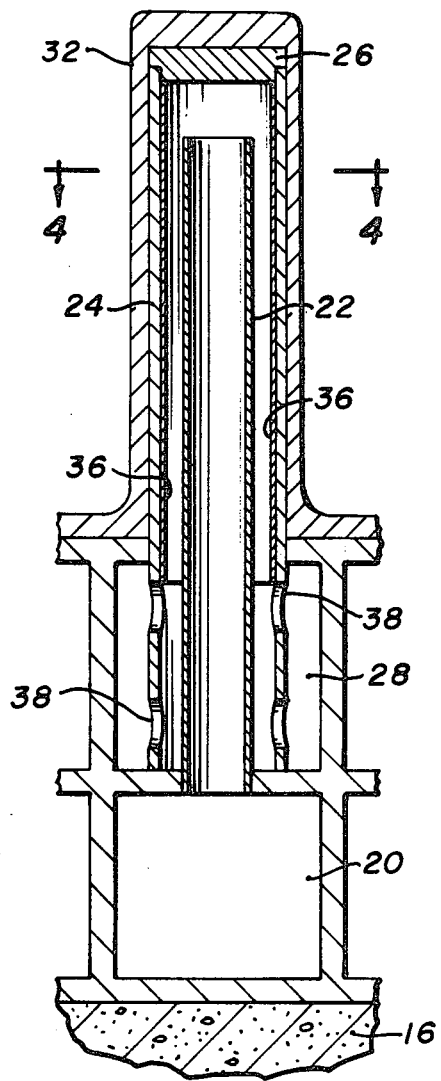
FIG. 3 is a cross-section of the heat exchanger molten core retention and solidification apparatus showing the concentric vertical tubes, the inlet plenum and the outlet plenum taken along the line 3—3 of FIG. 1.

To assure the uniform distribution of water through vertical tubes 24, orifices 38 may be placed somewhere in the flow path between the inlet plenum 20 and the outlet plenum 28. FIG. 3 shows orifices 38 at the location where the water discharges from outer tube 24 and passes into outlet plenum 28. These orifices may vary in size across the length of an outlet plenum 28 to further assure uniform distribution.

The volume between the exterior surface of the tube assemblies above the upper surface of outlet plenum 28 is sufficient to accommodate approximately 300,000 to 500,000 pounds of molten core, reactor internals and reactor vessel with a density on the order of that of iron. The molten material surrounds and is in heat exchange relation with vertical outer tube 24. Heat is removed by the water flowing within outer tube 24. It is expected that steam bubbles would form on the inner surface of outer tube 24; however, the water leaving outlet plenum 28 would be subcooled water under pressure.

The tube assemblies are arranged so that the maximum thickness of molten material is just a few centimeters to effectuate heat transfer from the molten material. Heat contained in the molten material can be transferred from the molten material until it solidifies and even after it solidifies. Furthermore, decay heat is produced after the molten core has solidified and can also be removed from the mass contained within molten core retention and solidification apparatus 10. The wall of concrete reactor cavity 12 in the region of molten core retention and solidification apparatus 10 is lined with a layer of protective insulating material 32. Alternatively, a separate peripheral wall may be constructed to contain the molten material. The peripheral wall in the region of molten core retention and solidification apparatus 10 is lined with a layer of protective insulating material 32 and may be water cooled.

I claim:

1. In a nuclear reactor having a containment shell housing a nuclear reactor vessel with a reactor core in said reactor vessel, a fluid cooled heat exchanger molten core retention and solidification apparatus for confining molten material in the event of a meltdown of said reactor core and said nuclear reactor vessel while removing heat from the molten material to a location external to the containment shell, comprising:

a. an open-top confinement shell disposed within the containment shell directly beneath the reactor vessel, the confinement shell defining a cavity for collecting molten material from the reactor vessel in the event of a core meltdown;

b. a plurality of vertically extending heat exchange tube assemblies disposed within the confinement shell beneath the reactor vessel, each tube assembly including a neutron absorbing material and comprising a vertically extending outer tube being closed at its upper end and open at its lower end and a vertically extending inner tube disposed substantially concentrically within and spaced from the outer tube so as to define a flow passageway through the interior of the inner tube and the annular space between the outside of the inner tube and the inside of the outer tube, the inner tube being open at both its upper and lower ends;

c. a protective material covering the exterior surface of the outer tube of each tube assembly, the protective material conducting heat from the molten material to the underlying outer tube, said protective material having a melting temperature sufficiently above the temperature of the molten material such that the protective material can withstand the temperature of the molten material without melting;

d. a plurality of orifices, one in the flow passageway of each tube assembly, to control fluid flow through each flow passageway, wherein the size of said orifice varies depending upon the location of said orifice in the heat exchanger apparatus;

e. an inlet plenum disposed beneath the plurality of tube assemblies, the inlet plenum connected in fluid communication with one of the tubes of each tube assembly;

f. an outlet plenum disposed beneath the plurality of tube assemblies, the outlet plenum connected in fluid communication with the other of the tubes of each tube assembly; and g. means for circulating a heat exchange fluid into the inlet plenum, thence from the inlet plenum through the flow passageways defined within the tube assemblies into and through the outlet plenum to a location external to the containment shell, the heat exchange fluid flowing through the tube assemblies being passed in heat exchange relationship with any molten material from a core meltdown collecting in the confinement cavity so as to absorb heat therefrom and remove said heat to a location external to the containment shell.

2. A heat exchanger molten core retention and solidification apparatus as recited in claim 1 wherein: the inlet plenum is disposed beneath the outlet plenum.

3. A heat exchanger molten core retention and solidification apparatus as recited in claim 1 wherein: each row of said tube assemblies is in fluid communication with a separate outlet plenum.

4. A heat exchanger molten core retention and solidification apparatus as recited in claim 1 wherein: each row of said tube assemblies is in fluid communication with a separate inlet plenum.

* * * * *